May 20, 1952     A. E. DRISSNER     2,597,712
CHUCKING MECHANISM

Filed Oct. 11, 1950     3 Sheets-Sheet 1

INVENTOR.
ALFRED E. DRISSNER
BY Woodling and Krost
attys

May 20, 1952     A. E. DRISSNER     2,597,712
CHUCKING MECHANISM

Filed Oct. 11, 1950     3 Sheets-Sheet 2

INVENTOR.
ALFRED E. DRISSNER
BY Woodling and Krost
attnys

May 20, 1952  A. E. DRISSNER  2,597,712
CHUCKING MECHANISM
Filed Oct. 11, 1950  3 Sheets-Sheet 3

INVENTOR.
ALFRED E. DRISSNER
BY Woodling and Krost
attys

Patented May 20, 1952

2,597,712

UNITED STATES PATENT OFFICE 2,597,712

CHUCKING MECHANISM

Alfred E. Drissner, Cleveland, Ohio, assignor to The National Acme Company, a corporation of Ohio Application October 11, 1950, Serial No. 189,559

9 Claims. (Cl. 279—110)

This invention relates to a chucking mechanism and to a jaw type workpiece chuck and rotating device.

The present chuck or gripping device was designed for use with very heavy machining or forgings such as automobile axles and workpieces similar thereto. The chuck illustrated herein is a three jaw chuck. However, it is understood that chucks with various numbers of jaws may be constructed without departing from the spirit and scope of the invention. The present chuck as described, illustrated and defined in this application is the same as the chuck used in the copending application entitled, "Double End Turning Machine" by the same inventor and filed October 11, 1950, Serial No. 189,537. In designing the present chuck primarily for use in the identified double end turning machine, several objects of the invention became apparent.

One of these objects of the invention is to provide a jaw type chuck which is powerful in grip and simple in construction and operation.

Another object of the invention is to provide a chucking mechanism which cannot easily become clogged from dirt or other waste materials.

A still further object of the invention is to provide a jaw type chuck which is powerful and yet inexpensive to manufacture.

A still further object of the invention is to provide a jaw type chuck wherein the jaws are adaptable to a wide range of travel to compensate various diameters on workpieces inserted therein.

Yet a still further object of the invention is to provide a jaw type chuck wherein the jaws or slides are radially slidable between cover members and are urged towards each other by a cam member movable in a line transverse of the radial movement of the jaws.

Other objects and a fuller understanding of this invention may be had by referring to the following description and claims, taken in conjunction with the accompanying drawing, in which:

Figure 1:
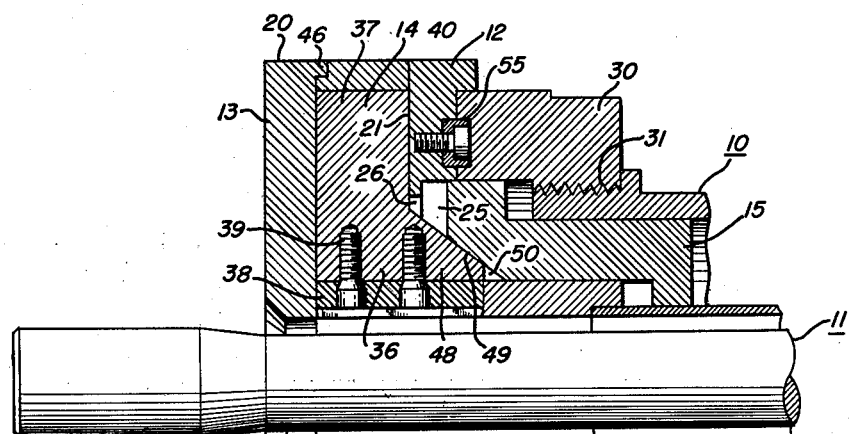
Figure 1 is a cross-sectional view of the chucking mechanism with the jaw slides open.

Throughout the application, the similar reference characters on the various figures of the drawings, refer to the same parts. The exact arrangement of parts and the exact description and structure herein may be varied and modified without departing from the spirit and scope of the invention, since the illustrations and description are of the preferred embodiment of the invention.

Figure 2:
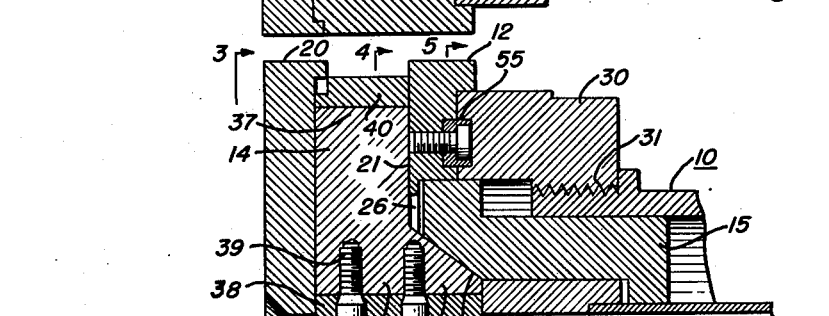
Figure 2 is a cross-sectional view the same as Figure 1, except with the jaw slides gripping a workpiece.

A chucking mechanism is mountable on a rotatable spindle 10 which in this instance is hollow to receive a workpiece such as axle 11 therein. The chuck comprises first and second cover members 12 and 13 respectively, which are fastened together and also are mounted on the end of the spindle 10 as illustrated in the drawings. These first and second cover members 12 and 13 form a chuck body for supporting the slides or jaws and other component working parts of the chucking mechanism. In the illustrations of Figures 1 and 2, the chuck mechanism is on the end of the spindle 10, which may be the hollow rotary spindle in the referred to co-pending application. The cover members 12 and 13 support slides or jaws 14 for radial movement towards and away from the axes of the spindle 10 and the chucking mechanism. These slides or chuck jaws 14 may be urged towards each other by an operating sleeve 15 cammingly engaging the slides 14. This operating sleeve 15 is reciprocally movable in the spindle 10 axially of the spindle 10 and transversely to the line of movement of the slides 14.

Figure 4:
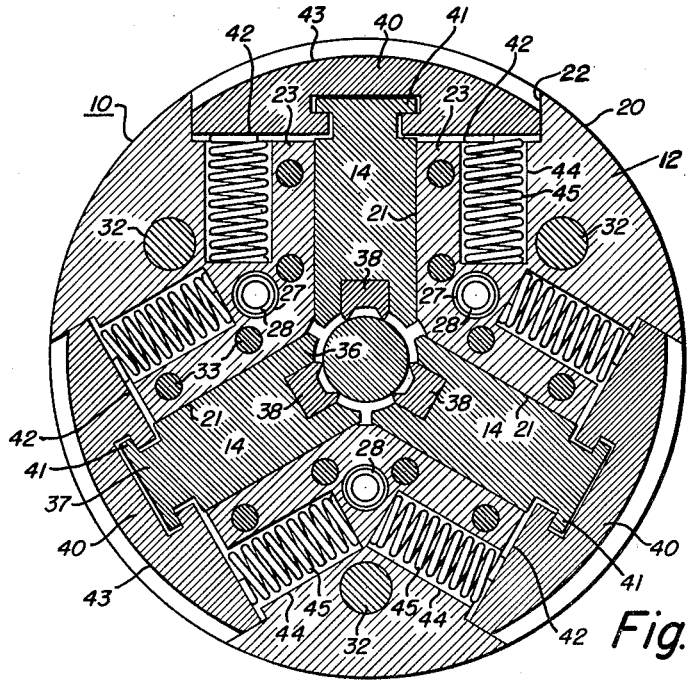
Figure 4 is a cross-sectional view taken along the line 4—4 of Figure 2.
Figure 5:
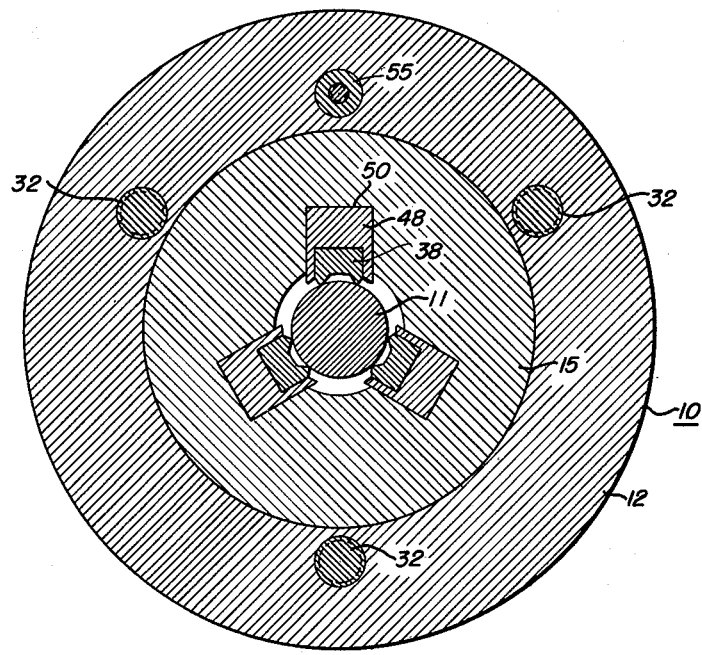
Figure 5 is a cross-sectional view taken along the line 5—5 of Figure 2.

The first cover member 12 is described herein as being the cover member closest to the end of the spindle 10. The cover members 12 and 13 provide a circumferential surface 20 extending thereabout. As is best illustrated in Figures 1, 2 and 4, the first cover member 12 is provided with slideways 21 in which the slides 14 are radially movable. The slideways 21 are angularly spaced about the axis of the cover members and extend radially. In the present instance substantially all of the slideways are in the first cover member 12 with the second cover member 13 furnishing only one flat surface in the slideways 21. It is understood that the slideways 21 may have the major portion thereof in either cover member 12 or 13 or may be equally divided therebetween. In any instance, however, the slideways may be considered to be between the cover members 12 and 13.

The first cover member 12 is also provided with annularly spaced recesses 22 in the circumferential surface 20 thereof. These recesses 22 merge with the slideways 21 and define wall portions 23, one on each side of each slideway. The wall portions 23 extend transversely or at right angles to the slideway and are an integral portion of the first cover member. Again it is understood that the recesses may be in both cover members in the same manner as the slideways. Both cover members 12 and 13 have a center opening 24 for receiving the workpiece such as the axle 11 illustrated herein whereby the workpiece may be extended through the body of the chucking mechanism. In the present instance, the opening 24 has a diameter greater than the diameter of the workpiece 11 at the vicinity of where the workpiece will be gripped by the chuck slides or jaws 14. However, it is noted in observing the drawings that the workpiece 11 is of larger diameter on the end thereof than at the center portion and the center opening 24 in the chucking mechanism must be large enough to receive the enlarged end of the workpiece. Thus, the slides or chuck jaws 14 must also have sufficient travel to be withdrawn entirely out of the limits of the center opening 24 as illustrated in Figure 1 and to be radially forced towards each other a sufficient distance to grip the workpiece as illustrated in Figure 2.

In further describing the first cover member, it is noted that the first cover member 12 is provided with an annular recess 25 on the side thereof furthest from the second cover member 13 and closest to the spindle 10. Extending between this annular recess 25 and each of the slideways 21 is a slot 26 through which a part of the slide or chuck jaw 14 extends. The operating sleeve 15 is reciprocally movable axially in this annular recess 25 and cammingly engages the slides 14 within the recess 25. The first cover member 12 is also provided with annularly spaced spring holes 27 as illustrated in Figures 2 and 4 extending through the first cover member 12 and merging with the annular recess 25. Each of these spring holes 27 is adapted to receive the spring 28 which abuts against the second cover member 13 and urges the operating sleeve 15 away from the cover members and in a direction out of the annular recess 25 to release the grip of the chuck jaws on the workpiece.

In this particular instance, an adapater 30 having an inside surface co-extending with the surface of the annular recess 25 is secured to the first member 12. The adapter 30 is threaded on to the end of the spindle 10 as illustrated by threads 31 in the drawings. When an adapter 30 is used, the chucking mechanism, that is, the cover members, slides and operating sleeves may be used on different spindles by simply changing adapters. The first and second cover members 12 and 13 are fastened to the adapter 30 by long bolts or screws 32 extending through the cover members and threaded into the adapter.

Figure 3:
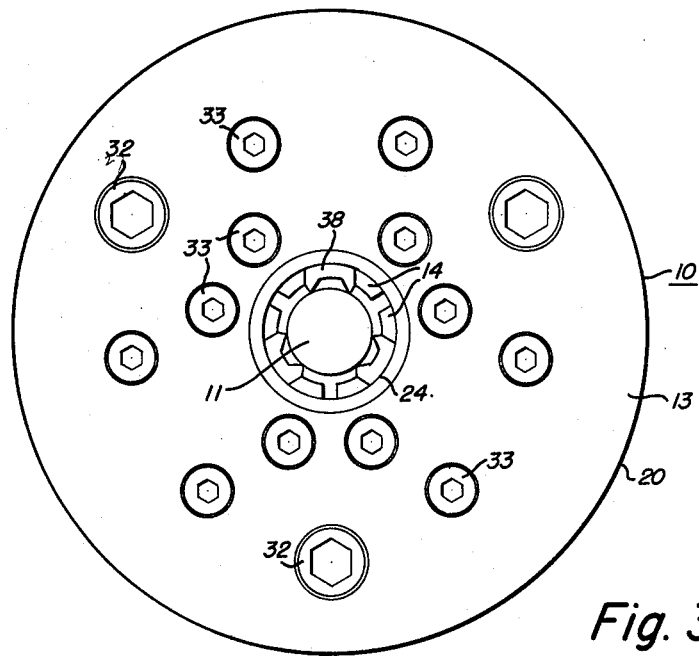
Figure 3 is an end view taken along the line 3—3 of Figure 2.

The second cover member 13 is illustrated herein as being of somewhat flat plate shape and is fastened to the first cover member 12 by screws or bolts 33. In this particular instance, these screws or bolts 33 which hold the cover members together are aligned with two on each side of each slideway as illustrated in Figure 3. This spacing of these screws or bolts 33 and the extending of the long screws or bolts 32 through both cover members and into the adapter provides a very strong, rigid and economical structure to manufacture and assemble.

Each slide 14 is described herein as having an inner end 36 and an outer end 37. Hard metal jaw inserts 38 are bolted by bolts 39 or otherwise secured in the inner end 36 of the slides 14. The inserts 38 may be of design and material desired by the user of the chucking mechanism and depending on general practice in accordance with the materials being chucked. Fastened to the outer end 37 of each slide is a spring plate 40 which extends transversely thereof in the recess 22. This spring plate 40 is illustrated herein as being operably fastened to the outer end 37 by a tongue and groove connection 41 since this type of connection is very strong, reliable and economical to manufacture. The spring plate 40 is provided with an opposing surface 42 extending parallel to and facing the wall portions 23 in the bottom of the recesses 22. For constructing a neat appearing and easy cleaning chucking mechanism, the outer surface 43 of the spring plate 40 may be curved similar to the curving of the circumferential surface 20. When the outer surface 43 is of the same curvature as the circumferential surface 20, the surfaces will merge into substantially a single surface as illustrated in Figure 1 when the chuck is open.

The wall portions 23 are provided with spring receiving bores 44 aligned parallel to the slideways 21 and adapted to receive springs 45. There is preferably a bore 44 and a spring 45 on each side of the slideway with a spring 45 abutting the opposing surface 42 of the spring plate 40 on each side of the slide 14 for urging the spring plate and the slide therewith radially outwardly of the chuck body or cover members. The outward movement of spring plate 40 and thus of the slides 14 is limited by a stop flange 46 on the second cover member and extending into the recess 22. This stop flange 46 is illustrated as being on the circumferential edge of the second cover member. However, it is understood that the stop flange could be constructed on the first cover member or that other stop means could be employed.

Each slide 14 is provided with a cam portion 48 having a cam surface 49 at the inner end 36 thereof. As illustrated in Figures 1 and 2, this cam portion 48 extends through slot 26 and into the annular recess 25 whereby the cam surface 49 may be cammingly engaged by the operating sleeve 15. The operating sleeve 15 is provided with tapered slots 50 on the inside end corner thereof with the bottom of these tapered slots 50 providing cam surfaces engaging the cam surfaces 49. The tapered slots 50 are annularly spaced with each slot receiving the cam portion 48 of its respective slide 14. Thus, in the present instance, there are three tapered slots in the operating sleeve 15 since there are three slides or jaws 14 in the chucking mechanism.

Mounted within the operating sleeve 15 as illustrated in Figure 1 is a tube 52 and its end member 53 which prevents dirt or other unwanted materials entering into the hollow spindle 10 and into the working parts of the chucking mechanism. This tube 52 and its end member 53 correspond with the similar parts in the copending application.

In operation, the springs 28 urge the operating sleeve 15 endwise away from the cover members 12 and 13 and the springs 45 simultaneously urge the spring plates 40 and the jaws 14 therewith radially outwardly from the opening 24. The chuck jaws are illustrated in the open position in Figure 1 with the springs 45 and 28 in extended position. After a workpiece, such as the workpiece 11, has been inserted in the chucking mechanism, the operating sleeve 15 is urged to the left in Figure 1 to the position in Figure 2. The operating sleeve 15 operates through the tapered slots 50 and the cam portions 48 to radially contract the slides or jaws 14 causing them to move radially in, and grip the workpiece inserted therein. This movement of the operating sleeve 15 to the position in Figure 2 is against the urging of the springs 28 and 45 and compresses all of these springs. After the workpiece has been machined and is to be removed from the chucking mechanism, the operating sleeve 15 is moved to the right from the position in Figure 2 to the position in Figure 1 and the jaws are again opened by the urging of the respective springs 28 and 45.

When chucks of this type are used for machining axles, the chucks must be very powerful and must withstand great rotational forces to turn the axle relative to the cutting tools. This rotational force must travel from the spindle 10 through the adapter 30 and into the first cover member 12 to turn the cover members 12 and 13 and the slides or jaws 14 therewith. As a supplement to the long bolts or screws 32 which extend through the cover members and into the adapter 30, buttons, such as driving buttons 55, have been used. These driving buttons 55 are imbedded both in the first cover member 12 and the adapter 30 to transfer rotational driving force from one part to the other part. The chucking mechanism is also stronger when the slides or jaws 14 are within the first cover member 12 than when they are partly within the second cover member 13. The structure described and claimed herein has been found to be very practical and to withstand great forces as described in the herein referred to co-pending application.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A workpiece chuck and rotating device comprising, a rotatable spindle, first and second cover members fastened together and providing a circumferential surface therearound, first screws fastening said members together, second screws extending through said members and fastening the same to said rotatable spindle, said first member having radially extendible slideways next adjacent said second member, said members having an opening in the center thereof merging with said slideways, said first member having recesses in the circumferential surface merging with said slideways and defining a wall portion on each side of each slideway and perpendicular to the slideways, a radially movable slide in each slideway, each slide having an inner end and an outer end, a spring plate on the outer end of each slide and extending transversely therefrom, said spring plate and said slide having a cooperating tongue and groove connection connecting the slide and the spring plate together, said spring plate having a first surface opposing and facing the transverse walls on each side of the slideway of the first member, each of said transverse walls having a bore in each side of said slideway and extending parallel to the slideway, an expansion spring in each bore abutting the first surfaces of said plate and urging said spring plate and the slide fastened thereto radially outwardly from the work receiving opening in the center of the cover members, said second cover member having stop flanges on the circumferential edge thereof, one extending into each of said recesses and abuttable by the respective said spring plate to limit the radially outward movement of the spring plate and the slides relative to the cover members, each of said slides having a cam portion extending through said first cover member, and an operating cam sleeve axially reciprocable in said rotatable spindle and in said first cover member and cammingly engaging said cam portions of said slides.

2. A workpiece chuck and rotating device comprising, a rotatable spindle, first and second cover members fastened together and providing a circumferential surface therearound, first screws fastening said members together, second screws extending through said members and fastening the same to said rotatable spindle, said first member having radially extendible slideways next adjacent said second member, said members having an opening in the center thereof merging with said slideways, said first member having recesses in the circumferential surface merging with said slideways and defining a wall portion on each side of each slideway and perpendicular to the slideways, a radially movable slide in each slideway, each slide having an inner end and an outer end, a spring plate on the outer end of each slide and extending transversely therefrom, said spring plate and said slide having a cooperating tongue and groove connection connecting the slide and the spring plate together, said spring plate having a first surface opposing and facing the transverse walls on each side of the slideway of the first member, each of said transverse walls having a bore in each side of said slideway, and extending parallel to the slideway, an expansion spring in each bore abutting the first surfaces of said plate and urging said spring plate and the slide fastened thereto radially outwardly from the work receiving opening in the center of the cover members, each of said slides having a cam portion extending through said first cover member, and an operating cam sleeve axially reciprocable in said rotatable spindle and in said first cover member and cammingly engaging said cam portions of said slides.

3. A workpiece chuck and rotating device comprising, a rotatable spindle, first and second cover members fastened together and providing a circumferential surface therearound, fastening means fastening said members together and to said rotatable spindle, said first member having radially extendible slideways next adjacent said second member, said members having an opening in the center thereof merging with said slideways, said first member having recesses in the circumferential surface merging with said slideways and defining a wall portion on each side of each slideway and perpendicular to the slideways, a radially movable slide in each slideway, each slide having an inner end and an outer end, a spring plate on the outer end of each slide and extending transversely therefrom, said spring plate and said slide having a cooperating tongue and groove connection connecting the slide and the spring plate together, said spring plate having a first surface opposing and facing the transverse walls on each side of the slideway of the first member, each of said transverse walls having a bore in each side of said slideway and extending parallel to the slideway, an expansion spring in each bore abutting the first surfaces of said plate and urging said spring plate and the slide fastened thereto radially outwardly from the work receiving opening in the center of the cover members, said second cover member having stop flanges on the circumferential edge thereof, one extending into each of said recesses and abuttable by the respective said spring plate to limit the radially outward movement of the spring plate and the slides relative to the cover members, each of said slides having a cam portion extending through said first cover member, a circular recess in said first cover member extending about the said cam portions, an operating cam sleeve axially reciprocable in said rotatable spindle and in said first cover member and cammingly engaging said cam portions of said slides.

4. A workpiece chuck and rotating device comprising, a rotatable spindle, first and second cover members fastened together and providing a circumferential surface therearound, fastening means fastening said members together and to said rotatable spindle, said first member having radially extendible slideways next adjacent said second member, said members having an opening in the center thereof merging with said slideways, said first member having recesses in the circumferential surface merging with said slideways and defining a wall portion on each side of each slideway and perpendicular to the slideways, a radially movable slide in each slideway, each slide having an inner end and an outer end, a spring plate on the outer end of each slide and extending transversely therefrom, said spring plate and said slide having a cooperating tongue and groove connection connecting the slide and the spring plate together, said spring plate having a first surface opposing and facing the transverse walls on each side of the slideway of the first member, each of said transverse walls having a bore in each side of said slideway and extending parallel to the slideway, and expansion spring in each bore abutting the first surfaces of said plate and urging said spring plate and the slide fastened thereto radially outwardly from the work receiving opening in the center of the cover members, each of said slides having a cam portion extending through said first cover member, an operating cam sleeve axially reciprocable in said rotatable spindle and in said first cover member and cammingly engaging said cam portions of said slides.

5. A workpiece chuck and rotating device comprising, first and second cover members fastened together and providing a circumferential surface therearound, fastening means fastening said members together, said first member having radially extendible slideways next adjacent said second member, said members having an opening in the center thereof merging with said slideways, said first member having recesses in the circumferential surface merging with said slideways and defining a wall portion on each side of each slideway and perpendicular to the slideways, a radially movable slide in each slideway, each slide having an inner end and an outer end, a hardened workpiece engaging tip on the inner end of each slide, a spring plate on the outer end of each slide and extending transversely therefrom, said spring plate and said slide having a cooperating tongue and groove connection connecting the slide and the spring plate together, said spring plate having a first surface opposing and facing the transverse walls on each side of the slideway of the first member, said spring plate having a curved outer surface similar to the circumferential surface of the cover members, each of said transverse walls having a bore in each side of said slideway and extending parallel to the slideway, an expansion spring in each bore abutting the first surfaces of said plate and urging said spring plate and the slide fastened thereto radially outwardly from the work receiving opening in the center of the cover members, said second cover member having stop flanges on the circumferential edge thereof, one extending into each of said recesses and abuttable by the respective said spring plate to limit the radially outward movement of the spring plate and the slides relative to the cover members, each of said slides having a cam portion extending through said first cover member, a circular recess in said first cover member extending about the said cam portions, an operating cam sleeve axially reciprocable in said first cover member and cammingly engaging said cam portions of said slides.

6. A workpiece chuck and rotating device comprising, first and second cover members fastened together and providing a circumferential surface therearound, fastening means fastening said members together, said first member having radially extendible slideways next adjacent said second member, said members having an opening in the center thereof merging with said slideways, said first member having recesses in the circumferential surface merging with said slideways and defining a wall portion on each side of each slideway, each slide having an inner end and an outer end, a spring plate on the outer end of each slide and extending transversely therefrom, said spring plate and said slide having a cooperating tongue and groove connection connecting the slide and the spring plate together, said spring plate having a first surface opposing and facing the transverse walls on each side of the slideway of the first member, each of said transverse walls having a bore in each side of said slideway and extending parallel to the slideway, an expansion spring in each bore abutting the first surfaces of said plate and urging said spring plate and the slide fastened thereto radially outwardly from the work receiving opening in the center of the cover members, said second cover member having stop flanges on the circumferential edge thereof, one extending into each of said recesses and abuttable by the respective said spring plate to limit the radially outward movement of the spring plate and the slides relative to the cover members, each of said slides having a cam portion extending through said first cover member, a circular recess in said first cover member extending about the said cam portions, an operating cam sleeve axially reciprocable in said first cover member and cammingly engaging said cam portions of said slides.

7. A workpiece chuck and rotating device comprising, first and second cover members fastened together and providing a circumferential surface therearound, screws fastening said members together, said first member having radially extendible slideways next adjacent said second member, said members having a work receiving opening in the center thereof merging with said slideways, said first member having recesses in the circumferential surface merging with said slideways and defining a transverse wall on each side of each slideway and perpendicular to the slideways, a radially movable slide in each slideway, each slide having an outer end, a spring plate on the outer end of each slide and extending transversely therefrom, said spring plates and said slides having cooperating tongue and groove connections interconnecting the respective slides and the spring plates, each of said spring plates having a first surface opposing and facing the transverse walls on each side of the slideway of the first member, each of said transverse walls having a bore in each side of said slideway and extending parallel to the slideway, compression springs in said bores abutting the first surfaces of said spring plates and urging said spring plates and the slides fastened thereto radially outwardly from the work receiving opening in the center of the cover members, said second cover member having stop flanges on the circumferential edge thereof, one extending into each of said recesses and abuttable by the respective spring plate to limit the radially outward movement of the spring plates and the slides relative to the cover members, each of said slides having a cam portion, and an operating cam sleeve axially reciprocable relative to said first cover member and cammingly engageable with said cam portions of said slides.

8. A workpiece chuck and rotating device comprising, first and second cover members fastened together and providing a circumferential surface therearound, fastening means fastening said members together, said first member having radially extendible slideways next adjacent said second member, said members having an opening in the center thereof merging with said slideways, said first member having recesses in the circumferential surface merging with said slideways and defining a transverse wall on each side of each slideway and perpendicular to the slideways, a radially movable slide in each slideway, each slide having an outer end, a spring plate on the outer end of each slide and extending transversely therefrom, said spring plates and said slides having cooperating tongue and groove 45 connections interconnecting the respective slides and the spring plates, said spring plates having a first surface opposing and facing the transverse walls on each side of the slideway of the first member, each of said transverse walls having a bore in each side of said slideway and extending parallel to the slideway, a compression spring in each bore abutting the first surfaces of said spring plates and urging said spring plates and the slides fastened thereto radially outwardly from the opening in the center of the cover members, each of said slides having a cam portion, and an operating cam sleeve axially reciprocable relative to said first cover member and cammingly engageable with said cam portions of said slides.

9. A workpiece chuck and rotating device comprising, first and second cover members fastened together and providing an annular surface therearound, fastening means fastening said members together, said first member having radially extendible slideways next adjacent said second member, said members having an opening in the center thereof merging with said slideways, said first member having recesses in the circumferential surface merging with said slideways and defining a transverse wall on each side of each slideway, each slide having an outer end, a spring plate on the outer end of each slide and extending transversely therefrom, said spring plates and slides having cooperating tongue and groove connections interconnecting the respective slides and spring plates, said spring plates having first surfaces opposing and facing the transverse walls on each side of the slideway of the first member, spring means in said first cover member abutting the first surfaces of said spring plates and urging said spring plates and the slides fastened thereto radially outwardly from the opening in the center of the cover members, said second cover member having stop flanges on the circumferential edge thereof, one extending into each of said recesses and abuttable by the respective spring plates to limit the radially outward movement of the spring plates and the slides relative to the cover members, each of said slides having a cam portion, and an operating cam sleeve axially reciprocable relative to said first cover member and cammingly engageable with said cam portions of said slides.

ALFRED E. DRISSNER.

REFERENCES CITED

The following references are of record in the file of this patent:

UNITED STATES PATENTS

| Number | Name | Date |
|---|---|---|
| 66,107 | Strayer et al. | June 25, 1867 |
| 866,788 | Holstein | Sept. 24, 1907 |
| 988,376 | Niedhammer | Apr. 4, 1911 |
| 1,052,087 | Niedhammer | Feb. 4, 1913 |
| 1,886,083 | Church | Nov. 1, 1932 |
| 2,465,366 | Frettoloso | Mar. 29, 1949 |